(12) United States Patent
Cha

(10) Patent No.: US 10,718,430 B2
(45) Date of Patent: Jul. 21, 2020

(54) TRANSMISSION APPARATUS AND TRANSMISSION SYSTEM

(71) Applicant: SL Corporation, Daegu (KR)

(72) Inventor: Hongjun Cha, Daegu (KR)

(73) Assignee: SL Corporation, Daegu (KR)

( * ) Notice: Subject to any disclaimer, the term of this patent is extended or adjusted under 35 U.S.C. 154(b) by 189 days.

(21) Appl. No.: 15/940,185

(22) Filed: Mar. 29, 2018

(65) Prior Publication Data

US 2018/0283543 A1  Oct. 4, 2018

(30) Foreign Application Priority Data

Mar. 30, 2017  (KR) .......................... 10-2017-0041074

(51) Int. Cl.
| | | |
|---|---|---|
| *F16H 19/04* | (2006.01) | |
| *F16H 59/02* | (2006.01) | |
| *F16H 59/10* | (2006.01) | |
| *F16H 61/18* | (2006.01) | |
| *F16H 61/22* | (2006.01) | |
| *F16H 61/24* | (2006.01) | |
| *F16H 1/16* | (2006.01) | |

(52) U.S. Cl.
CPC .......... *F16H 61/22* (2013.01); *F16H 59/0278* (2013.01); *F16H 59/10* (2013.01); *F16H 61/18* (2013.01); *F16H 61/24* (2013.01); *F16H 1/16* (2013.01); *F16H 19/04* (2013.01); *F16H 2059/0282* (2013.01); *F16H 2059/0295* (2013.01); *F16H 2061/247* (2013.01)

(58) Field of Classification Search
CPC ...... F16H 59/0278; F16H 59/10; F16H 61/18; F16H 61/24; F16H 19/04; B60K 20/04; G05G 1/04
See application file for complete search history.

(56) References Cited

U.S. PATENT DOCUMENTS

| | | | | |
|---|---|---|---|---|
| 6,189,398 B1* | 2/2001 | Kataumi | ................. | F16H 59/10 |
| | | | | 74/423 |
| 2008/0042644 A1* | 2/2008 | Heo | ..................... | F16H 59/0204 |
| | | | | 324/207.2 |
| 2009/0217782 A1* | 9/2009 | Wang | ..................... | F16H 59/10 |
| | | | | 74/473.21 |
| 2012/0085193 A1* | 4/2012 | Heo | ....................... | F16H 59/04 |
| | | | | 74/473.18 |
| 2017/0059034 A1* | 3/2017 | Makimura | .......... | F16H 59/0278 |
| 2019/0211916 A1* | 7/2019 | Morimura | .......... | F16H 59/0204 |
| 2020/0149626 A1* | 5/2020 | Nakagawa | ............... | G05G 1/04 |

FOREIGN PATENT DOCUMENTS

| | | | |
|---|---|---|---|
| WO | WO 2005/031491 A1 * | 4/2005 | |
| WO | WO 2016/008929 A1 * | 1/2016 | |

* cited by examiner

*Primary Examiner* — Vinh Luong
(74) *Attorney, Agent, or Firm* — Nelson Mullins Riley & Scarborough LLP; Kongsik Kim, Esq.

(57) ABSTRACT

Provided herein are a transmission apparatus and a transmission system. The transmission apparatus includes a gear shift lever configured to receive a user command for shifting gear stages, a detent groove configured to be in contact with the gear shift lever and generate detent when the gear stages are shifted by the gear shift lever, a driver configured to generate a driving force when the ignition is turned off in a state in which the gear shift lever is positioned at a non-parking gear stage, and a driving force transmitter configured to separate the detent groove from the gear shift lever by the driving force.

13 Claims, 23 Drawing Sheets

TRANSMISSION APPARATUS AND TRANSMISSION SYSTEM

CROSS-REFERENCE TO RELATED APPLICATION

This application claims priority from Korean Patent Application No. 10-2017-0041074 filed on Mar. 30, 2017 in the Korean Intellectual Property Office, the disclosure of which is incorporated herein by reference in its entirety.

TECHNICAL FIELD

The present disclosure relates to a transmission apparatus and a transmission system, and more particularly, to a transmission apparatus and a transmission system which are capable of shifting a gear stage to a parking gear stage without a detent when the ignition is turned off at a non-parking gear stage.

RELATED ART

In general, gear stages of a transmission include a parking gear stage (P stage), a reverse gear stage (R stage), a neutral gear stage (N stage), and a driving gear stage (D stage). A driver adjusts the gear stages using a gear shift lever provided within a vehicle.

When the gear stage is shifted to the P stage, wheels of the vehicle enter a locked state, and thus the vehicle is prevented from moving. As the gear stage is shifted to the P stage, safe parking is possible.

Meanwhile, after driving is completed, the gear stage may not be shifted to the P stage due to a driver's inexperience or obliviousness. In such a case, there is an increased chance for accidents due to inadvertent movement of the vehicle.

Therefore, there is a need for a vehicle of which a gear stage is automatically shifted from a non-parking gear stage to a parking gear stage when driving is completed.

SUMMARY

Aspects of the present disclosure provide a transmission apparatus and a transmission system, which are capable of shifting a gear stage to a parking gear stage without a detent when the ignition is turned off at non-parking gear stages.

It should be noted that objects of the present disclosure are not limited to the above-described objects, and other objects of the present disclosure will be apparent to those skilled in the art from the following descriptions.

According to an aspect of the present invention, there is provided a transmission apparatus including a gear shift lever configured to receive a user command for shifting gear stages, a detent groove configured to be in contact with the gear shift lever and generate detent when the gear stages are shifted by the gear shift lever, a driver configured to generate a driving force when the ignition is turned off in a state in which the gear shift lever is positioned at non-parking gear stages, and a driving force transmitter configured to separate the detent groove from the gear shift lever by the driving force.

The detent groove may include a plurality of detent recesses and the detent may be generated as a bullet provided at an end portion of the gear shift lever is moved between the plurality of detent recesses. The plurality of detent recesses may include detent recesses corresponding to a parking gear stage, a reverse gear stage, a neutral gear stage, and a driving gear stage. In addition, the driving force transmitter may pivot the gear shift lever by the driving force so that the gear shift lever is moved to the parking gear stage.

The transmission apparatus may further include a support configured to support the detent groove and allow the gear shift lever to be pressed against the detent groove, wherein the support may be displaced by a driving force of the driver to release supporting of the detent groove. The support may include an inclined surface inclined in a movement direction, and the detent groove may be ascended by being pushed up the inclined surface or be descended due to a decrease in pressure applied from the inclined surface. The driving force transmitter may displace the support by the driving force to separate the detent groove from the gear shift lever.

The driving force transmitter may include a driving force input part configured to receive the driving force from the driver, and a driving force output part coupled to the driving force input part and pivoted with the driving force input part to displace the support and pivot the gear shift lever. The driving force output part may include a spur gear configured to be engaged with a rack gear provided at the support and laterally displace the support, and a transmission hole configured to apply a force to a rotation pin provided at the gear shift lever to pivot the gear shift lever.

The transmission apparatus may further include a transmission gear configured to transmit the driving force of the driver to the driving force transmitter, wherein the transmission gear may determine a gear ratio between the driver and the driving force transmitter. The driver may include a drive motor for generating a driving force, and a worm gear rotated by the driving force of the drive motor, and the transmission gear may include a worm wheel gear engaged with the worm gear, and a spur gear for transmitting the driving force input to the worm wheel gear to the driving force transmitter.

The transmission apparatus may further include a locker configured to obstruct the gear shift lever from being moved to a parking gear stage, and an actuator configured to control the locker to release the obstruction of the gear shift lever from being moved to the parking gear stage. The actuator may generate a driving force using a solenoid, and the locker may change a position thereof by the driving force generated by the solenoid to obstruct the gear shift lever from being moved to the parking gear stage or to accommodate a lock pin provided at the gear shift lever to retain the gear shift lever at the parking gear stage.

According to another aspect of the present invention, there is provided a transmission system including a transmission apparatus configured to shift a gear stage of a transmission, and a control apparatus configured to control the transmission apparatus to shift the gear stage to a parking gear stage by referring to at least one of a starting state of a vehicle and a state of the gear stage, wherein the transmission apparatus shifts the gear stage to the parking gear stage in a state of separating the gear shift lever from a detent groove.

When the ignition of the vehicle is turned off and the gear stage is a non-parking gear stage, the control apparatus may control the transmission apparatus to shift the gear stages to the parking gear stage in a state in which the gear shift lever is separated from the detent groove.

The transmission apparatus may include a locker configured to obstruct the gear shift lever from being moved to the parking gear stage, an actuator configured to control the locker to release the obstruction of the gear shift lever from being moved to the parking gear stage, a driver configured to generate a driving force, and a driving force transmitter configured to separate the detent groove from the gear shift lever by the driving force, and pivot the gear shift lever to move the gear shift lever to the parking gear stage.

The details of other exemplary embodiments are included in the detailed description and the drawings.

BRIEF DESCRIPTION OF THE DRAWINGS

The above and other aspects and features of the present disclosure will become more apparent by describing exemplary embodiments thereof in detail with reference to the attached drawings, in which.

DETAILED DESCRIPTION OF THE EMBODIMENTS

Figure 1:
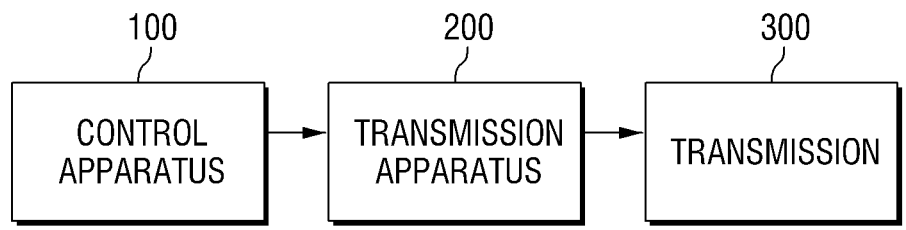
FIG. 1 is a block diagram illustrating a transmission system according to an exemplary embodiment of the present disclosure.

Hereinafter, exemplary embodiments of the present disclosure will be described in detail with reference to the accompanying drawings. The advantages and features of the present disclosure and the manner of achieving the advantages and features will become apparent with reference to the embodiments described in detail below with the accompanying drawings. The present disclosure may, however, be implemented in many different forms and should not be construed as being limited to the embodiments set forth herein, and the embodiments are provided such that this disclosure will be thorough and complete and will fully convey the scope of the present disclosure to those skilled in the art, and the present disclosure is defined by only the scope of the appended claims. Same reference numerals refer to same components throughout the disclosure.

In some embodiments, well-known process steps, well-known structures and well-known techniques will not be specifically described in order to avoid ambiguous interpretation of the present disclosure. The terms used in the present specification are for the purpose of illustrating the examples and do not limit the present disclosure. As used herein, the singular form also includes the plural forms unless specifically stated in a phrase. The terms "comprises" and/or "comprising" used in the specification are used in the meaning of not excluding the presence or addition of one or more other constituent elements, steps, operations and/or elements, in addition to the referenced constituent elements, step, operation and/or element. Further, the term "and/or" includes each and one or more combinations of the referenced items.

Unless defined otherwise, all terms (including technical and scientific terms) used herein may be used in a sense commonly understood by those skilled in the art to which this present disclosure pertains. Further, terms which are defined in a commonly used dictionary are not ideally or excessively interpreted unless explicitly defined otherwise.

FIG. 1 is a block diagram illustrating a transmission system according to an exemplary embodiment of the present disclosure.

Referring to FIG. 1, a transmission system 10 according to the exemplary embodiment of the present disclosure may include a control apparatus 100, a transmission apparatus 200, and a transmission 300.

The control apparatus 100 may control the transmission apparatus 200. The control apparatus 100 may transmit a control signal to the transmission apparatus 200 so that the transmission apparatus 200 causes a gear stage of the transmission 300 to be shifted.

Specifically, the control apparatus 100 may control the transmission apparatus 200 to shift the gear stages of the transmission 300 to a parking gear stage. At this point, the control apparatus 100 may control the transmission apparatus 200 by referring to at least one of a starting state of the vehicle and a gear stage state. For example, the control apparatus 100 may control the transmission apparatus 200 to shift the gear stages to a parking gear stage if the gear stage of the transmission 300 is a non-parking gear stage when the ignition of the vehicle is turned off.

The transmission apparatus 200 may serve to shift the gear stage of the transmission 300. In the present disclosure, the transmission apparatus 200 may include a gear shift lever for receiving a user command. A user may shift the gear stages of the transmission 300 using the gear shift lever.

Further, the transmission apparatus 200 may include a driver for moving the gear shift lever. The driver may move the gear shift lever in response to a control signal received from the control apparatus 100. For example, the driver may move a position of the gear shift lever to indicate the parking gear stage. At this point, the transmission apparatus 200 may shift the gear stage to the parking gear stage in a state with the gear shift lever separated from a detent groove which will be described below. Since the gear stage is shifted while the gear shift lever is separated from the detent groove, shift of the gear stage may be performed without a detent (e.g., friction or resistance).

The transmission 300 may determine the gear stage between an engine and wheels of the vehicle. In the present disclosure, the gear stage may include a parking gear stage (P stage), a reverse gear stage (R stage), a neutral gear stage (N stage), and a driving gear stage (D stage). Specifically, in the present disclosure, the gear stage may be configured in the order of the P stage, the R stage, the N stage, and the D stage.

The transmission 300 may determine a gear stage of the vehicle based on the gear stages indicated by the gear shift lever of the transmission apparatus 200 to transmit a driving force of the engine to the wheels or to prevent the rotation of the wheels.

Figure 2:
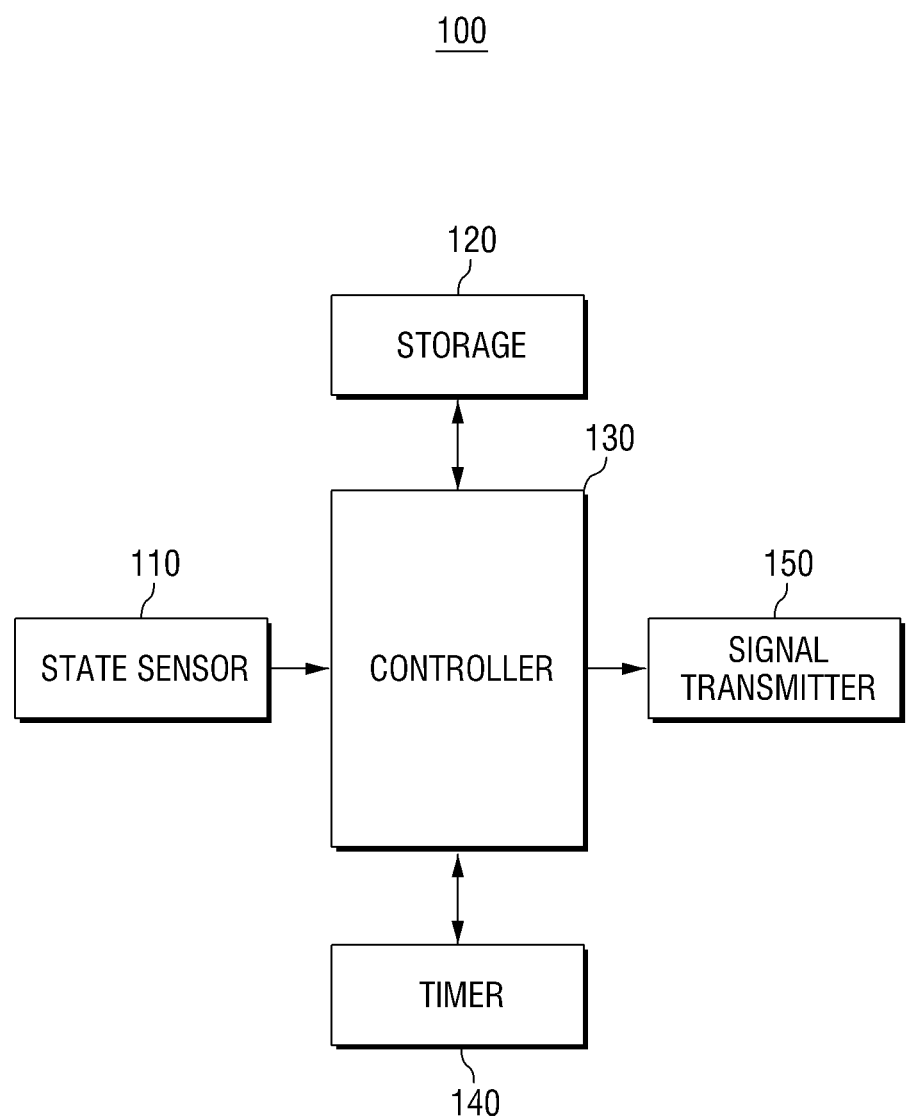
FIG. 2 is a block diagram illustrating a control apparatus according to an exemplary embodiment of the present disclosure.

FIG. 2 is a block diagram illustrating the control apparatus according to the exemplary embodiment of the present disclosure.

Referring to FIG. 2, the control apparatus 100 according to the exemplary embodiment of the present disclosure may include a state sensor 110, a storage 120, a controller 130, a timer 140, and a signal transmitter 150.

The state sensor 110 may sense a state of the vehicle. For example, the state sensor 110 may sense at least one of a traveling state of the vehicle, a starting state, a selected state of a brake pedal, a selected state of a button of the gear shift lever, and a gear stage state of the vehicle.

The traveling state of the vehicle indicates whether the vehicle is traveling. For example, the traveling state may include a state in which the vehicle is traveling at an absolute velocity exceeding zero and a state in which the absolute velocity is zero. Here, the absolute velocity represents an absolute value of the velocity. For example, the absolute velocity of the vehicle may exceed zero not only in a forward direction but also in a reverse direction. Hereinafter, a state in which the absolute velocity of the vehicle exceeds zero is referred to as a vehicle moving state, and a state in which the absolute velocity of the vehicle is zero is referred to as a vehicle stationary state.

The starting state of the vehicle indicates whether a vehicle is started. Hereinafter, a state in which the vehicle is started is referred to as an ignition on state, and a state in which the vehicle is not started is referred to as an ignition off state.

The selected state of the brake pedal indicates whether the brake pedal is depressed (e.g., stepped on) by a user. Hereinafter, a state in which the brake pedal is stepped on is referred to as a pedal depressed state, and a state in which the pedal is not stepped on is referred to as a pedal non-depressed state.

The selected state of the button of the gear shift lever indicates whether the button provided at the gear shift lever is pressed by the user. Hereinafter, a state in which the button is pressed is referred to as a button pressed state, and a state in which the button is not pressed is referred to as a button released state.

The gear stage state of the vehicle indicates that the transmission 300 can select any gear between the engine and the wheels. The gear stage state may include a P stage state, an R stage state, an N stage state, and a D stage state. Further, a gear stage state that is not the P stage state is referred to as a non-parking gear stage state.

The storage 120 may serve to temporarily or permanently store information on a vehicle state, which is received from the state sensor 110. Further, the storage 120 may temporarily store various pieces of information which is internally transmitted within the control apparatus 100.

The controller 130 may generate a control signal for controlling the transmission apparatus 200 by referring to the vehicle state transmitted from the state sensor 110. For example, in a vehicle moving state, the controller 130 may generate a control signal for controlling the transmission apparatus 200 to block (e.g., prevent) the R stage and the P stage from being selected. Hereinafter, the control signal for blocking the selection of the R stage and the P stage is referred to as a blocking control signal.

Further, in a vehicle stationary state, a pedal depressed state, and a button pressed state, the controller 130 may generate a control signal for controlling the transmission apparatus 200 to allow any gear stage including the R stage and the P stage to be selected. Hereinafter, the control signal for allowing any of the gear stages to be selected is referred to as a release control signal.

Specifically, the controller 130 according to the exemplary embodiment of the present disclosure may generate a control signal for automatically shifting a gear stage to the P stage in the vehicle stationary state, the ignition off state, and the non-parking gear stage state. Hereinafter, the control signal for automatically shifting the gear stages to the P stage is referred to as an automatic control signal.

When the non-parking gear stage state is sustained for a certain period of time after the traveling state of vehicle is changed from the vehicle moving state to the vehicle stationary state, the controller 130 may generate the automatic control signal. For example, when the D stage state is sustained for a certain period of time after the vehicle is changed to the vehicle stationary state, the controller 130 may generate the automatic control signal. The timer 140 may be used to determine the elapsed time. The timer 140 may provide the controller 130 with an elapsed time from a time when the vehicle moving state is changed to the vehicle stationary state.

The control signal generated from the controller 130 may be transmitted through the signal transmitter 150 and the transmitted control signal may be received by the transmission apparatus 200.

The transmission apparatus 200 receiving the control signal may receive a user command according to the received control signal. For example, when a blocking control signal is received, the transmission apparatus 200 may receive one of the gear stages except the R stage and the P stage, and when a release control signal is received, the transmission apparatus 200 may receive any of the gear stages. Further, when an automatic control signal is received, the transmission apparatus 200 may automatically shift the gear stage to the P stage.

Hereinafter, a configuration and operation of the transmission apparatus 200 will be described in detail with reference to the accompanying drawings.

Figure 3:
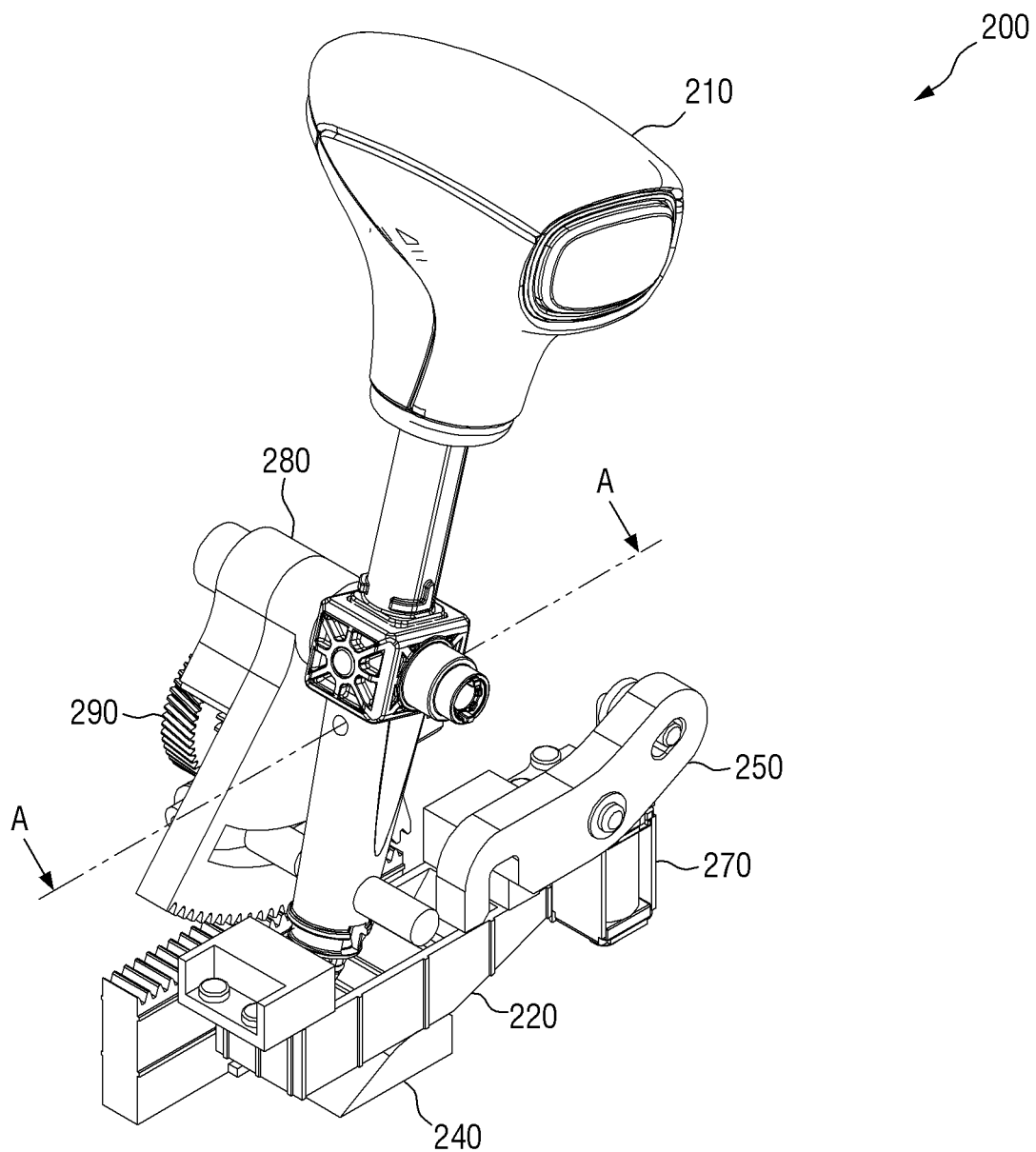
FIG. 3 is a perspective view of a transmission apparatus according to an exemplary embodiment of the present disclosure.
Figure 4:
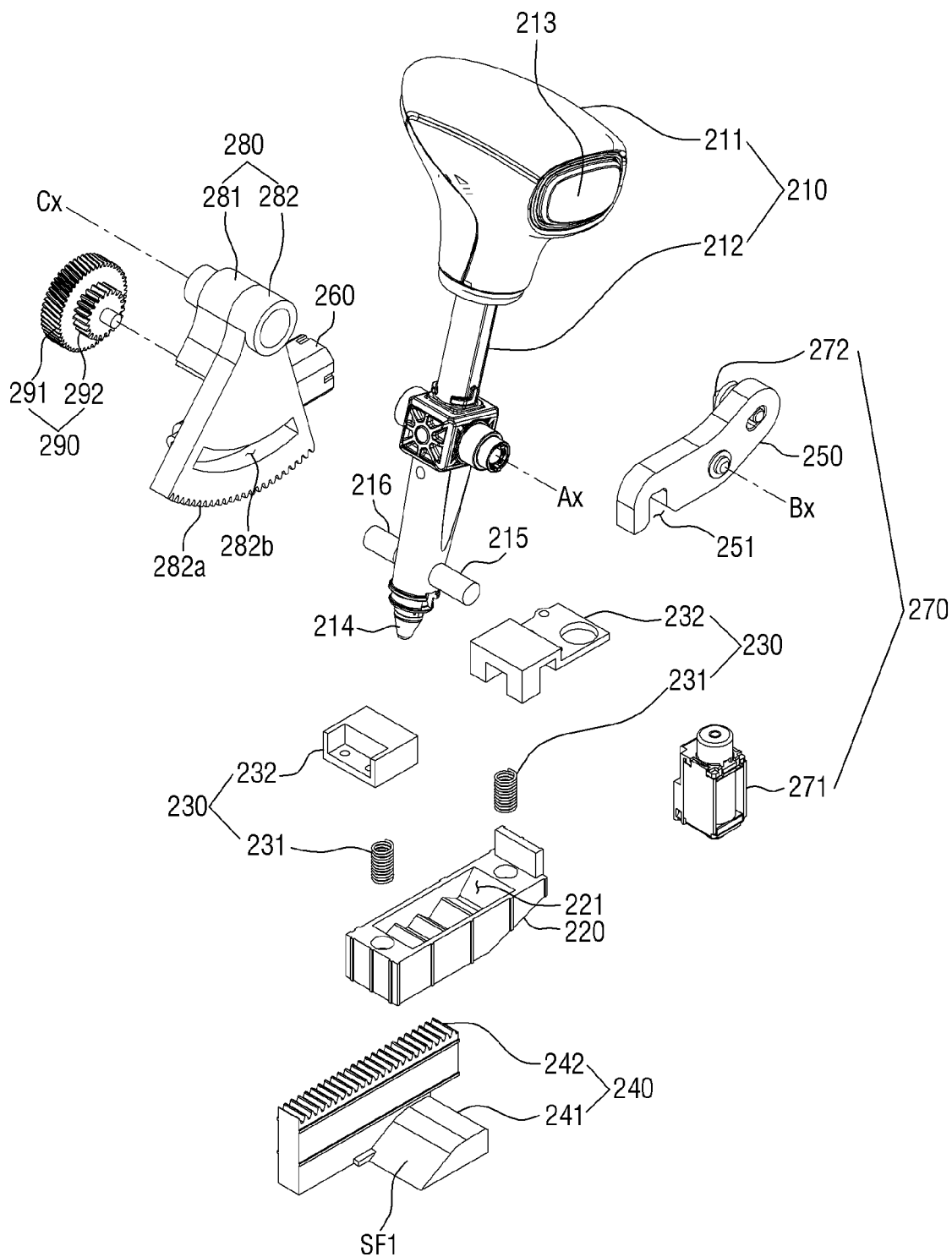
FIGS. 4 to 6 are exploded perspective views of the transmission apparatus according to the exemplary embodiment of the present disclosure.
Figure 5:
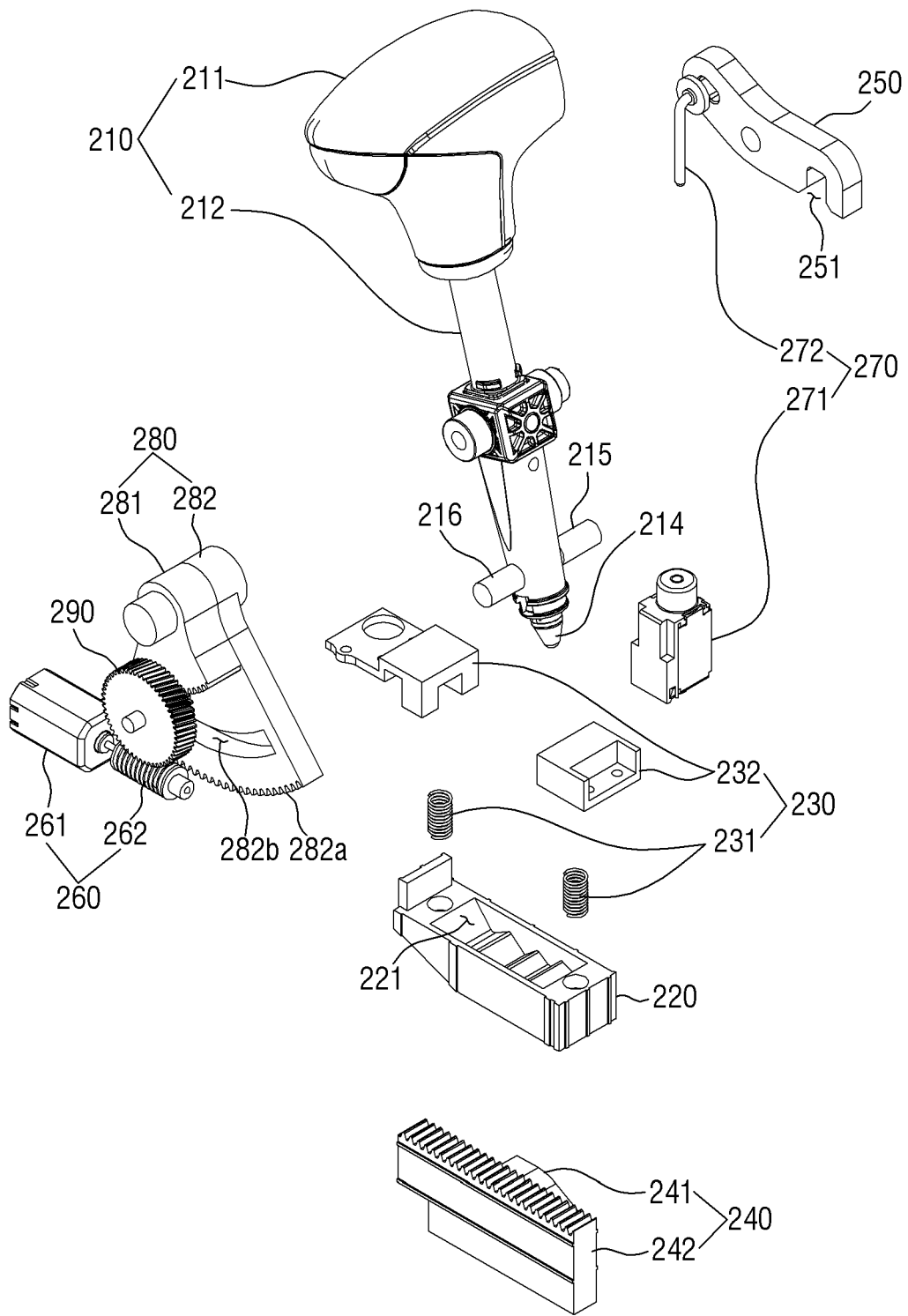
Figure 6:
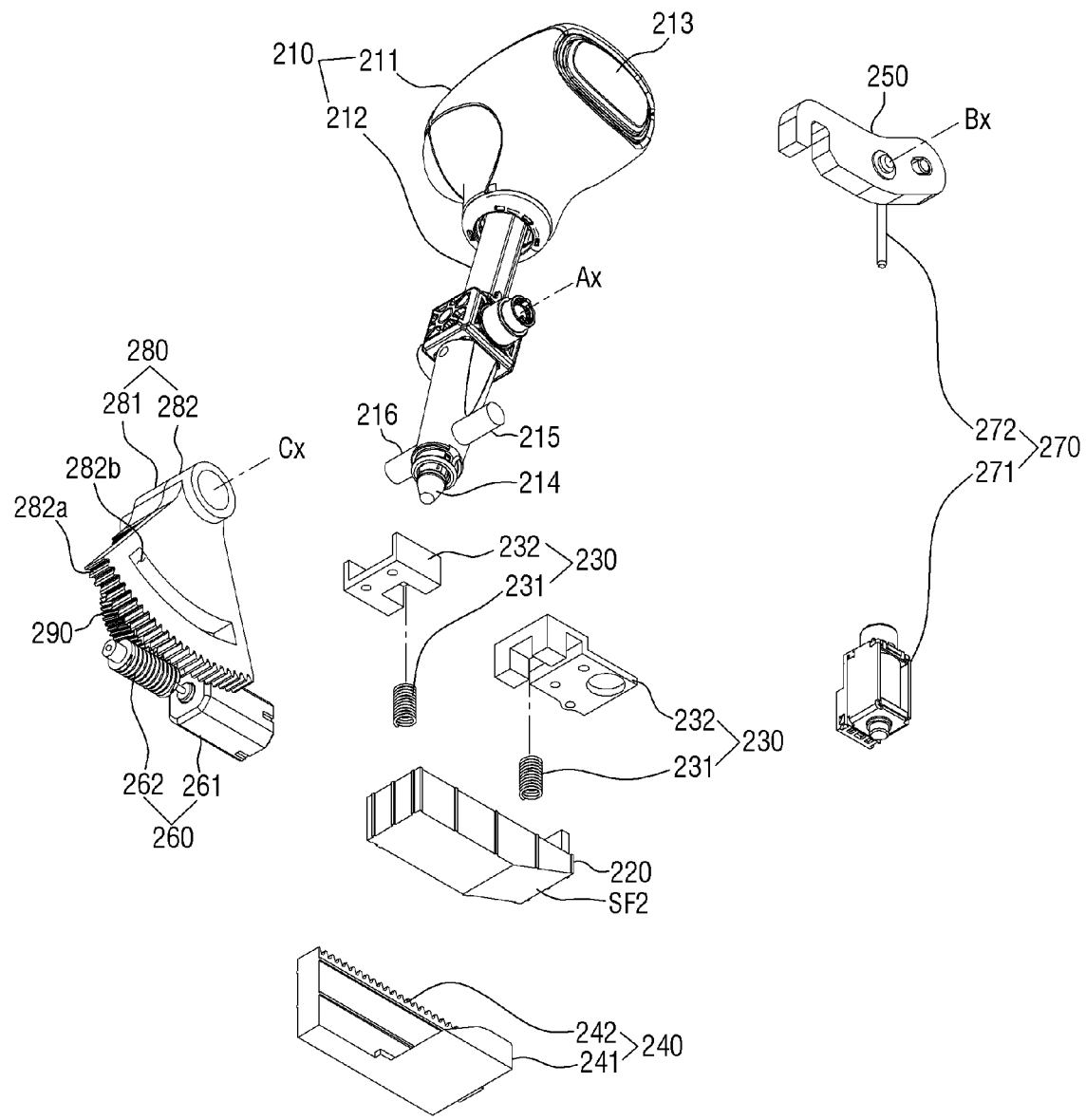

FIG. 3 is a perspective view of the transmission apparatus according to an exemplary embodiment of the present disclosure, and FIGS. 4 to 6 are exploded perspective views of the transmission apparatus according to the exemplary embodiment of the present disclosure.

Referring to FIGS. 3 to 6, the transmission apparatus 200 according to the exemplary embodiment of the present disclosure may include a gear shift lever 210, a detent groove 220, an elasticity provider 230, a support 240, a locker 250, a driver 260, an actuator 270, a driving force transmitter 280, and a transmission gear 290.

The gear shift lever 210 is configured to receive a user command for shifting the gear stage. To this end, the gear shift lever 210 may include a knob 211 and a rod 212.

The knob 211 may receive a force from the user and pivot the rod 212. The rod 212 may be pivoted around a rotational axis Ax by a force input to the knob 211.

A bullet 214 may be provided at an end portion of the rod 212. An accommodation space for accommodating a portion of the bullet 214 may be provided within the rod 212. An elastic part (not shown) for providing an elastic force to the bullet 214 may be provided in the accommodation space of the rod 212. The elastic part may be provided in a form of a spring.

The elastic part may provide a force pushing the bullet 214 in an outward direction of the rod 212. Thus, when an external force is generated, at least a part of an exposed portion of the bullet 214 may be inserted (e.g., retreated) into the accommodation space, and when the external force is released, at least the part of the bullet 214 inserted into the accommodation space may be released from the accommodation space.

A lock pin 215 and a rotation pin 216 may be provided at the rod 212. The lock pin 215 and the rotation pin 216 may be formed to protrude outward from an outer surface of the rod 212. For example, the lock pin 215 and the rotation pin 216 may be formed to protrude in a direction perpendicular to the outer surface of the rod 212.

The lock pin 215 may serve to allow only certain gear stages to be selected among the gear stages. For example, movement of the lock pin 215 may be blocked (e.g., obstructed) by the locker 250 such that the gear shift lever 210 may be moved to indicate the N stage or the D stage but may not be moved to indicate the P stage or the R stage.

Further, the lock pin 215 may serve to fix (e.g., retain) the gear shift lever 210 to the P stage.

The rotation pin 216 may receive an external force for changing a position of the gear shift lever 210. The gear shift lever 210 may receive an external force from the driving force transmitter 280 through the rotation pin 216 to be pivoted around the rotational axis Ax such that the position of gear shift lever 210 may be changed.

A button 213 may be provided at the knob 211. The button 213 is configured to receive a user command for selectively changing a position of the gear shift lever 210. As described above, a state of the button 213 may include the button pressed state and the button released state.

The position of the gear shift lever 210 may be changeable between some of the gear stages so as to indicate a corresponding gear stage even in the button released state, but for some other gear stages, the position of the gear shift lever 210 may be changeable only in the button pressed state. For example, the position of the gear shift lever 210 may be pivoted and reciprocated between the D stage and the N stage even in the button released state. However, in a state in which the D stage or the N stage is indicated, the position of the gear shift lever 210 may be changed to indicate the R stage or the P stage only in the button pressed state. Further, in a state in which the R stage or the P stage is indicated, the position of the gear shift lever 210 may be changed to indicate the D stage or the N stage only in the button pressed state.

Although the selective position change of the gear shift lever 210 according to whether the button 213 is pressed has been described, this is for illustrative purposes only, and aspects of the position change of the gear shift lever 210 according to whether the button 213 is pressed may be varied.

The detent groove 220 may generate a detent (e.g., resistance or friction) when the gear stage is shifted by the gear shift lever 210 by being in contact with the gear shift lever 210. The detent groove 220 may include a plurality of detent recesses 221, and the bullet 214 provided at the end portion of the gear shift lever 210 may be inserted into one of the plurality of detent recesses 221 such that the detent groove 220 may be in contact with the gear shift lever 210. In a state when the detent groove 220 is maintained in contact with the gear shift lever 210, the detent may be generated when the bullet 214 is moved between the plurality of detent recesses 221 according to the position change of the gear shift lever 210.

As described above, the portion of the bullet 214 may be inserted into the rod 212 or be released to the outside of the rod 212 by the elastic part. With such a movement of the bullet 214, the bullet 214 may be moved between adjacent detent recesses 221 such that the detent may be generated.

In the present disclosure, the plurality of detent recesses 221 may include the detent recesses corresponding to the P stage, the R stage, the N stage, and the D stage. Specifically, the plurality of detent recesses 221 may include detent recesses formed in the order of the P stage, the R stage, the N stage, and the D stage.

The elasticity provider 230 may provide the detent groove 220 with a downward pushing force. To this end, the elasticity provider 230 may include an elastic part 231 and a base 232.

The elastic part 231 may be provided in the form of a spring. An end portion of one side of the elastic part 231 may abut an upper surface of the detent groove 220 and the end portion of the other side of the elastic part 231 may abut a lower surface of the base 232. The base 232 may be fixed to a housing (not shown) for accommodating the transmission apparatus 200, or to a vehicle body (not shown). Accordingly, the elastic part 231 supported by the base 232 may apply a downward force onto the detent groove 220.

The support 240 may support the detent groove 220. In particular, the support 240 may support the lower surface of the detent groove 220. Therefore, even when the elasticity provider 230 provides the elastic force, the detent groove 220 may not be displaced downward due to the support 240.

As the support 240 supports the detent groove 220, the gear shift lever 210 may maintain contact with the plurality of detent recesses 221 and the bullet 214 provided at the end portion of the gear shift lever 210 may be moved between adjacent detent recesses 221 such that the detent may be generated.

The support 240 may include a support body 241 and a rack gear 242. The support body 241 may serve to support the detent groove 220. The rack gear 242 may receive an external force for laterally displacing the support body 241.

The support 240 of the present disclosure may be laterally displaced to support or release the detent groove 220. An inclined surface SF1 may be provided at the support body 241 to allow the support body 241 of the support 240 to be pushed and disposed beneath the detent groove 220. The inclined surface SF1 may be formed to be inclined in a movement direction of the support body 241.

The detent groove 220 may be ascended by being pushed up the inclined surface SF1 or be descended due to a decrease in pressure applied from the inclined surface SF2. An inclined surface SF2 which is formed to be inclined in the movement direction of the support body 241 may also be provided at the detent groove 220 to allow the detent groove 220 to abut the inclined surface SF1 of the support body 241.

The locker 250 is configured to block the gear shift lever 210 from being moved to the P stage. In the present disclosure, the locker 250 may be switched to a locked state or an unlocked state according to a position of the locker 250. When the locker 250 is in the locked state, movement of the lock pin 215 of the gear shift lever 210 may be obstructed by an end portion of the locker 250 such that the gear shift lever 210 may be prevented from being moved from the non-parking stage to the P stage. Alternatively, according to some exemplary embodiments of the present disclosure, the gear shift lever 210 may be blocked from being moved from the N stage or the D stage to the R stage or the P stage depending on a blocking range of the locker 250.

The locker 250 may include a lock recess 251. The lock recess 251 is configured to accommodate the lock pin 215 of the gear shift lever 210 and restrict the movement of the gear shift lever 210. In a state in which the gear shift lever 210 indicates the P stage, the lock pin 215 may be inserted into the lock recess 251 while the locker 250 is switched to a locked state.

Once the lock pin 215 is inserted into the lock recess 251, the gear shift lever 210 may be prevented from being moved, and if a predetermined condition is satisfied, the locker 250 may be switched to an unlocked state such that the gear shift lever 210 may be moved while the lock pin 215 is released from the lock recess 251. For example, when the vehicle stationary state, the pedal depressed state, and the button pressed state are satisfied, the locker 250 may be switched to the unlocked state.

The actuator 270 is configured to generate a driving force and change the position (e.g., orientation) of the locker 250. The driving force may be generated by a solenoid (not shown). To this end, the actuator 270 may include a driving body 271 for accommodating the solenoid and a drive pin 272 configured to be linearly displaced by the solenoid.

One end of the drive pin 272 may be inserted into the driving body 271 and the other end thereof may be connected to the locker 250. A portion of the drive pin 272 may be inserted into or released from the driving body 271 by the driving force of the actuator 270, and the locker 250 may be pivoted around a rotational axis Bx by the insertion (e.g., pull) and release (e.g., push) of the drive pin 272 to be switched to either a locked state or an unlocked state.

Accordingly, the position of the locker 250 may be changed by the driving force of the actuator 270 to block the gear shift lever 210 from being moved to the P stage or to accommodate the lock pin 215 provided at the gear shift lever 210 to fix the gear shift lever 210 to the P stage.

The actuator 270 may operate in response to a control signal received from the control apparatus 100. For example, when an automatic control signal is received, the actuator 270 may control the locker 250 to release the blocking of the gear shift lever 210 from being moved to the P stage. When the locker 250 is in a locked state, the locker 250 may be switched to an unlocked state by the driving force of the actuator 270.

Alternatively, when a blocking control signal is received, the actuator 270 may switch the locker 250 to the locked state such that the R stage and the P stage may be blocked from being selected by the gear shift lever 210.

Alternatively, when a release control signal is received, the actuator 270 may switch the locker 250 to the unlocked state such that any of the gear stages may be selected by the gear shift lever 210.

The driver 260 is configured to generate a driving force to operate the driving force transmitter 280. When the ignition is turned off in a state in which the gear shift lever 210 is positioned at a non-parking gear stage, the driver 260 may generate a driving force. The driver 260 may generate the driving force by receiving a control signal from the control apparatus 100.

The driver 260 may include a drive motor 261 and a worm gear 262. The drive motor 261 may generate a rotational driving force, and the worm gear 262 may be rotated by the rotational driving force.

A driving force provided by the worm gear 262 may be transmitted to the support 240 and the gear shift lever 210, and the driving force transmitter 280 and the transmission gear 290 may be provided to transmit the driving force of the worm gear 262.

The driving force transmitter 280 may pivot the gear shift lever 210 by the driving force transmitted from the driver 260, move the gear shift lever 210 to the P stage, and separate the detent groove 220 from the gear shift lever 210. To separate the detent groove 220 from the gear shift lever 210, the driving force transmitter 280 may displace the support 240 by the driving force of the driver 260.

The driving force transmitter 280 may include a driving force input part 281 and a driving force output part 282.

The driving force input part 281 is configured to receive the driving force from the driver 260. The driving force input part 281 may include a gear tooth to receive the driving force. The driving force input part 281 may be pivoted around a rotational axis Cx by the input driving force.

The driving force output part 282 may be coupled to the driving force input part 281 and be pivoted with the driving force input part 281 to move the support 240 and the gear shift lever 210. The support 240 may be linearly displaced by a driving force output by the driving force output part 282. The support 240 supporting the detent groove 220 may be displaced by the driving force transmitted from the driving force output part 282 to release the support of the detent groove 220.

Further, the gear shift lever 210 may be pivoted by the driving force output by the driving force output part 282. The gear shift lever 210 may be moved from the non-parking gear stage to the P stage by the driving force transmitted from the driving force output part 282.

The driving force output part 282 may include a spur gear 282a and a transmission hole 282b. The spur gear 282a may serve to laterally displace the support 240 by being engaged with the rack gear 242 provided at the support 240. The transmission hole 282b is configured to pivot the gear shift lever 210 by applying a force to the rotation pin 216 provided at the gear shift lever 210.

Further, the transmission hole 282b may provide a movement path of the rotation pin 216 according to the change of the position of the gear shift lever 210. In the present disclosure, the rotational axis Ax of the gear shift lever 210 may be the same as the rotational axis Cx of the driving force transmitter 280. The transmission hole 282b may have an arc-shape formed around the corresponding rotational axis Ax or Cx. Accordingly, the rotation pin 216 may be freely moved along the path defined by the transmission hole 282*b* such that the gear stages may be selected by the gear shift lever 210.

The driving force of the driver 260 may be transmitted to the driving force transmitter 280 through the transmission gear 290. The transmission gear 290 may include a worm wheel gear 291 and a spur gear 292. The worm wheel gear 291 is configured to receive the driving force by being engaged with the worm gear 262 of the driver 260. The spur gear 292 may serve to transmit the driving force, which is transmitted to the worm wheel gear 291, to the driving force transmitter 280. The spur gear 292 may be engaged with the driving force input part 281 of the driving force transmitter 280 such that the driving force is transmitted to the driving force transmitter 280.

The transmission gear 290 may determine a gear ratio between the driver 260 and the driving force transmitter 280. As shown in the drawing, a diameter of the worm wheel gear 291 may be different from that of the spur gear 292, and the gear ratio between the driver 260 and the driving force transmitter 280 may be determined based on a difference in the diameters.

Figure 7:
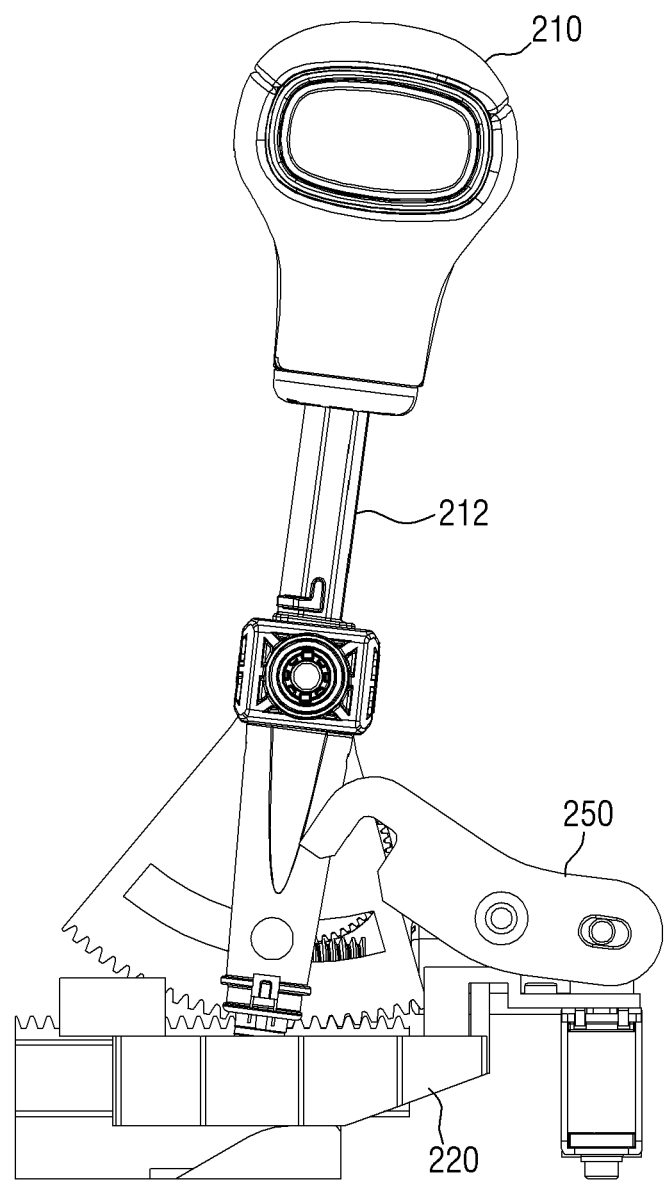
FIG. 7 is a side view of the transmission apparatus according to the exemplary embodiment of the present disclosure.
Figure 8:
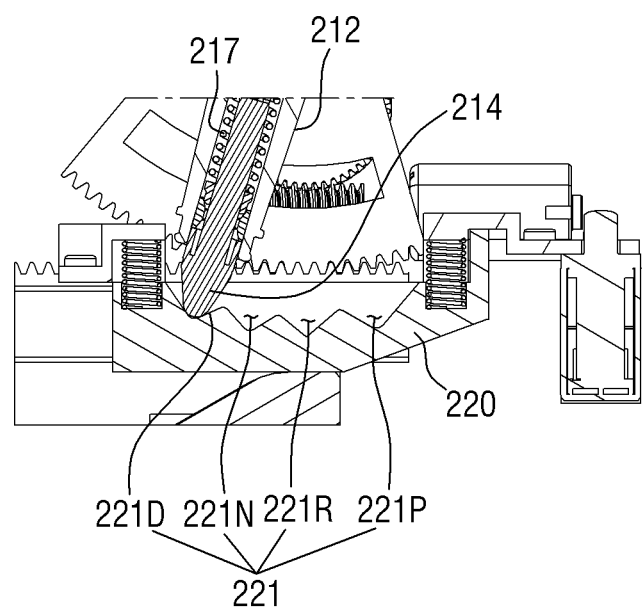
FIG. 8 is a cross-sectional view of the transmission apparatus according to the exemplary embodiment of the present disclosure taken along the A-A plane shown in FIG. 3.

FIG. 7 is a side view of the transmission apparatus according to the exemplary embodiment of the present disclosure, and FIG. 8 is a cross-sectional view of the transmission apparatus according to the exemplary embodiment of the present disclosure.

Referring to FIG. 7, a user may select a gear stage using the gear shift lever 210.

FIG. 7 shows that the locker 250 is in an unlocked state and thus any of the gear stages may be selected by the gear shift lever 210.

As shown in FIG. 8, a plurality of detent recesses 221 may be provided at the detent groove 220. The plurality of detent recesses 221 may include a parking gear stage detent recess 221P, a reverse gear stage detent recess 221R, a neutral gear stage detent recess 221N, and a driving gear stage detent recess 221D. FIG. 8 shows an example that the bullet 214 of the gear shift lever 210 is inserted into the driving gear stage detent recess 221D.

The bullet 214 of the gear shift lever 210 may be released or inserted from or into the rod 212, and a detent may be generated while the bullet 214 is moved between adjacent detent recesses 221.

Once the bullet 214 is inserted into one of the detent recesses 221, an outward pushing force may be applied to the bullet 214 by the elastic part 217 provided within the rod 212, and thus pivoting of the gear shift lever 210 may be restricted because the bullet 214 pushes the specific detent recess 221. At this point, when a force greater than a predetermined magnitude for pivoting the gear shift lever 210 is supplied, the gear stage may be shifted while the bullet 214 is moved between the plurality of detent recesses 221.

Figure 9:
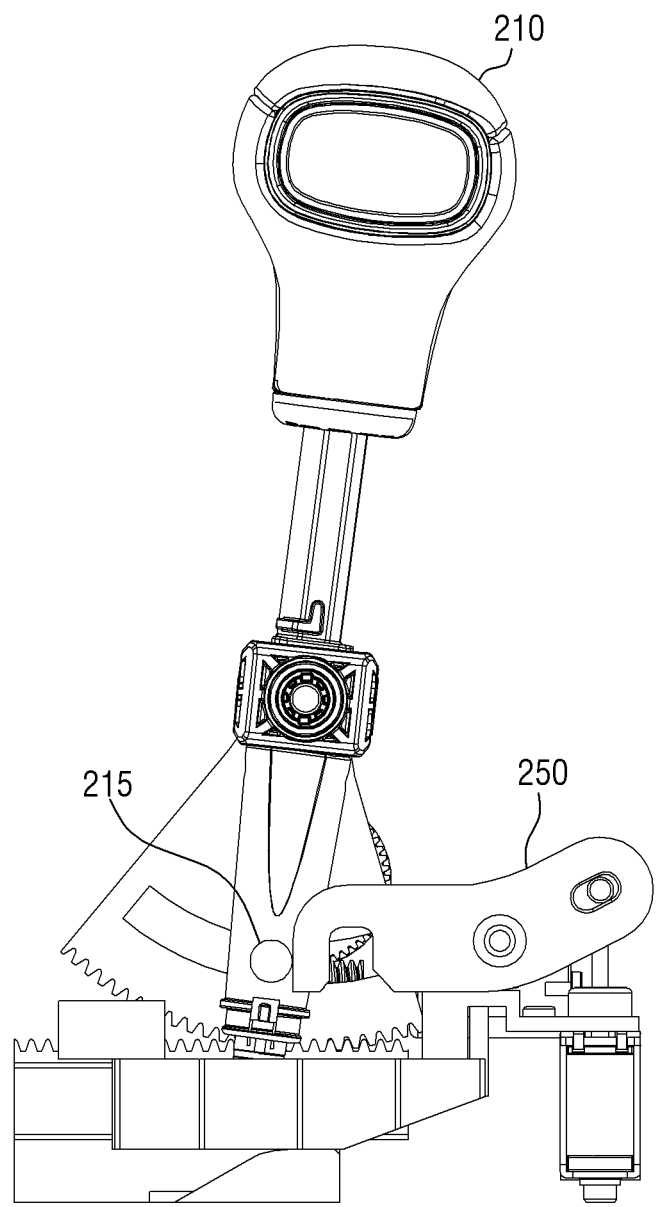
FIG. 9 is a diagram illustrating a case in which a locker according to the exemplary embodiment of the present disclosure is switched to a locked state.
Figure 10:
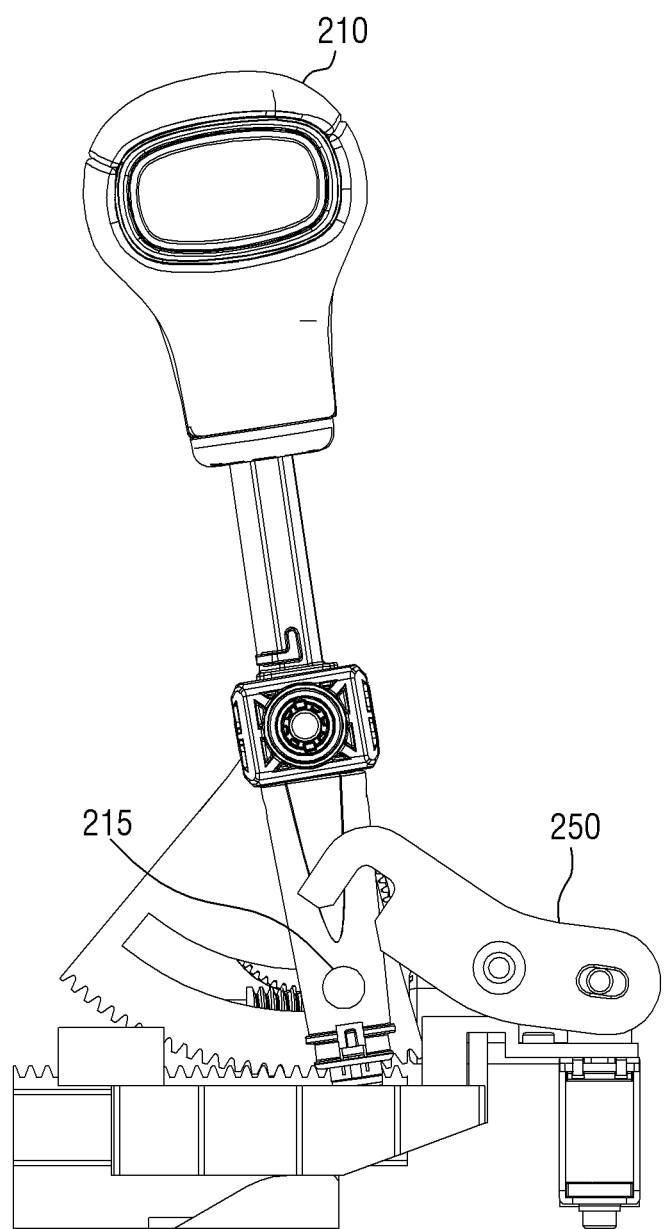
FIG. 10 is a diagram illustrating a case in which the locker according to the exemplary embodiment of the present disclosure is switched to an unlocked state.
Figure 11:
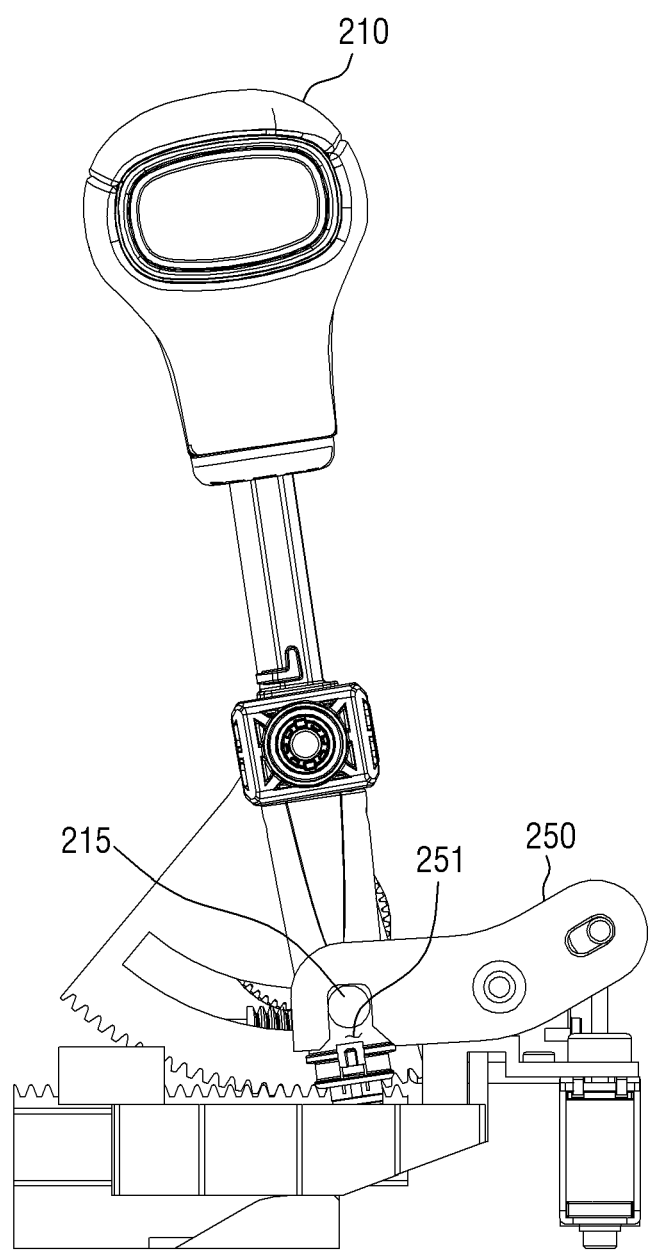
FIG. 11 is a diagram illustrating a case in which pivoting of a gear shift lever is blocked by the locker according to the exemplary embodiment of the present disclosure.

FIG. 9 is a diagram illustrating a case in which the locker according to the exemplary embodiment of the present disclosure is switched to a locked state, FIG. 10 is a diagram illustrating a case in which the locker according to the embodiment of the present disclosure is switched to an unlocked state, and FIG. 11 is a diagram illustrating a case in which pivoting of the gear shift lever is blocked (e.g., prevented or locked) by the locker according to the embodiment of the present disclosure.

Referring to FIG. 9, the locker 250 may be switched to a locked state. In the locked state, the locker 250 may restrict pivoting of the gear shift lever 210. The lock pin 215 of the gear shift lever 210 is blocked by the locker 250 such that the pivoting of the gear shift lever 210 may be restricted (e.g., obstructed).

As the pivoting of the gear shift lever 210 is restricted, selectable gear stages may be limited. For example, when the locker 250 is in a locked state, only the D stage and the N stage may be selected whereas the R stage and the P stage may not be selected.

Referring to FIG. 10, the locker 250 may be switched to an unlocked state. In the unlocked state, the locker 250 may not obstruct pivoting of the gear shift lever 210. Thus, any gear stages may be selected by the gear shift lever 210.

The unlocked state may occur when a predetermined condition is satisfied. For example, when a vehicle stationary state, a pedal depressed state, and a button pressed state are satisfied, the locker 250 may be switched to the unlocked state.

In the unlocked state, the user may manipulate the gear shift lever 210 to indicate the P stage. FIG. 10 illustrates an example of the gear shift lever 210 indicating the P stage.

Referring to FIG. 11, the locker 250 may be switched to a locked state in a state in which the gear shift lever 210 indicates the P stage.

The locker 250 is switched to the locked state in the state in which the gear shift lever 210 indicates the P stage such that the lock pin 215 of the gear shift lever 210 may be inserted into the lock hole 251 of the locker 250 to prevent pivoting of the gear shift lever 210. That is, in the state in which the lock pin 215 is inserted into the lock hole 251, the non-parking gear stage may not be selected by the gear shift lever 210.

As described above, the locker 250 of the present disclosure may have a locked state and an unlocked state. In the unlocked state, any gear stage may be selected by the gear shift lever 210. Meanwhile, depending on a gear stage indicated by the gear shift lever 210 at the time when the locker 250 is switched to the locked state, only the D stage or the N stage may become available by the gear shift lever 210, or the non-parking gear stages may not be selected by the gear shift lever 210 in the locked state.

A description on how the gear shift lever 210 is controlled by a user to shift the gear stage has been described with reference to FIGS. 9 to 11. Meanwhile, after driving of a vehicle is completed, the gear stage may not be shifted to the P stage due to a driver's inexperience or obliviousness. In this case, the vehicle may unintentionally move and cause an accident.

The transmission apparatus 200 according to the exemplary embodiment of the present disclosure may automatically shift a gear stage to the P stage based on an automatic control signal received from the control apparatus 100.

Hereinafter, a description on how the gear stage may be automatically shifted to the P stage will be made with reference to FIGS. 12 to 23.

Figure 12:
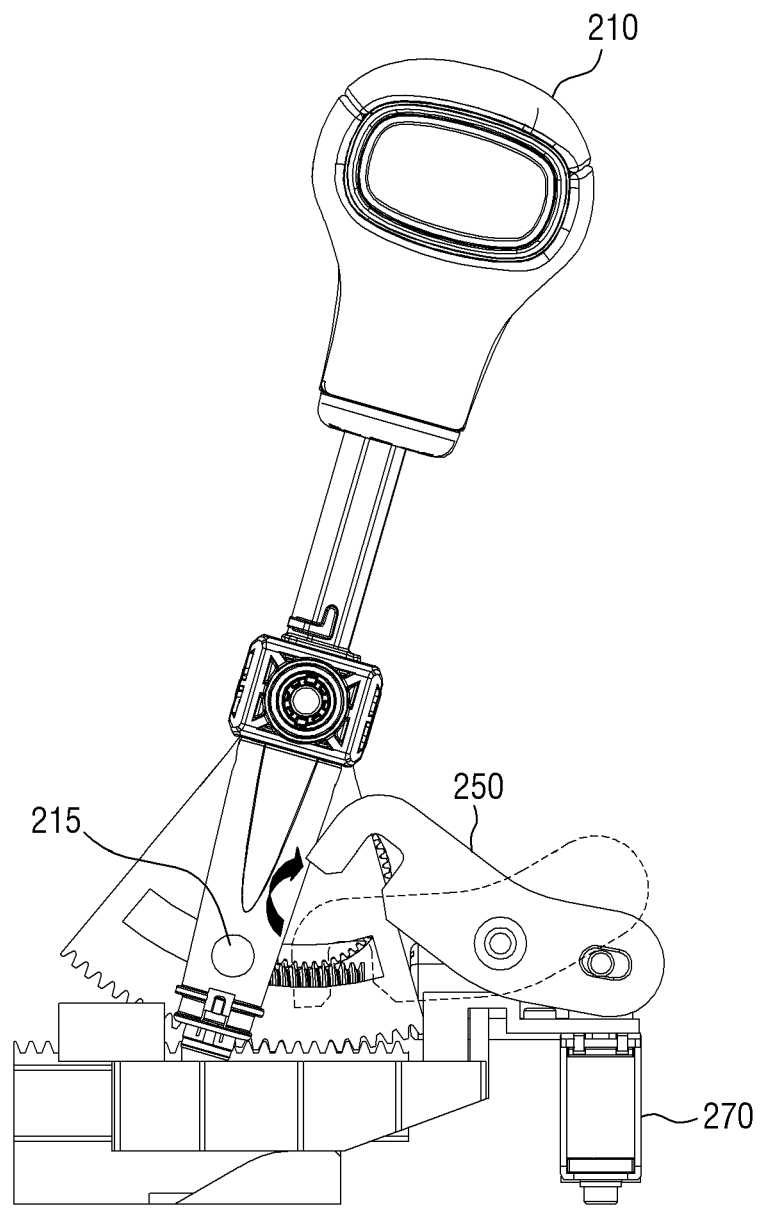
FIGS. 12 and 13 are diagrams illustrating a case in which the locker is switched to an unlocked state under the control of a control apparatus according to the exemplary embodiment of the present disclosure.
Figure 13:
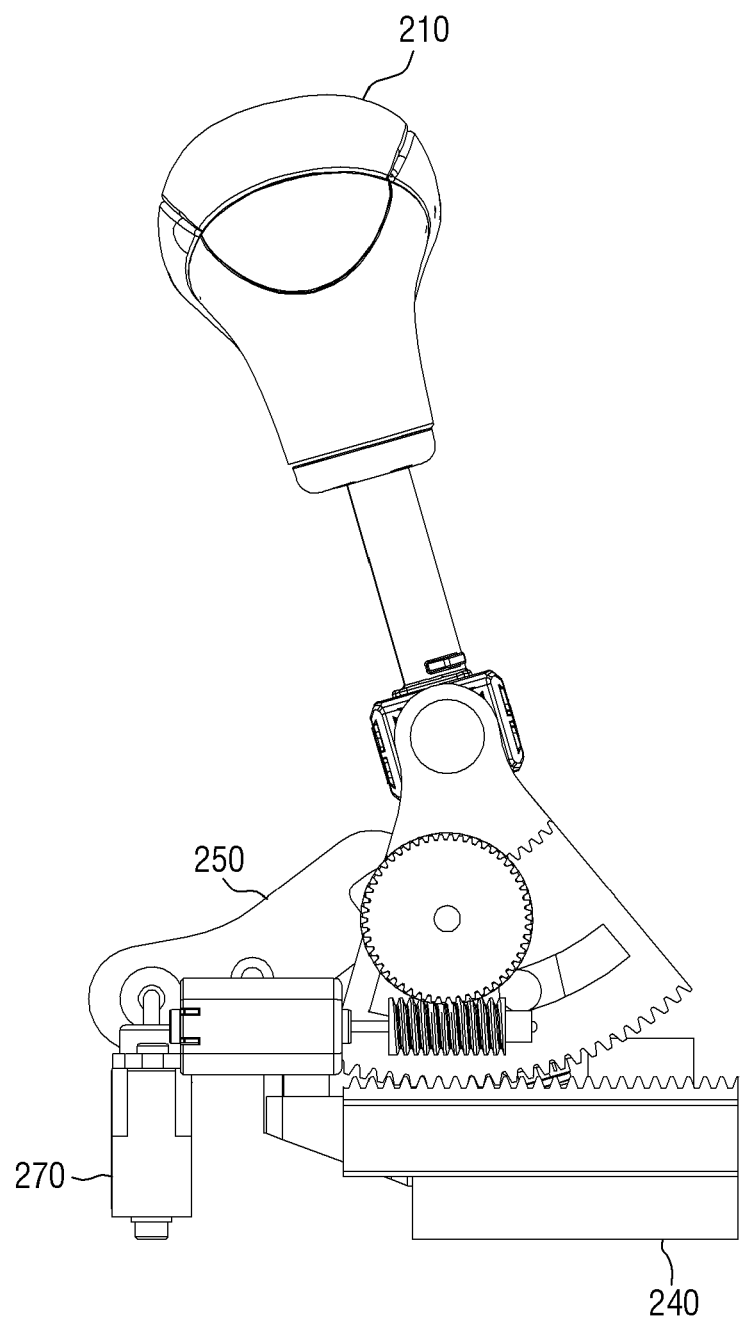
Figure 14:
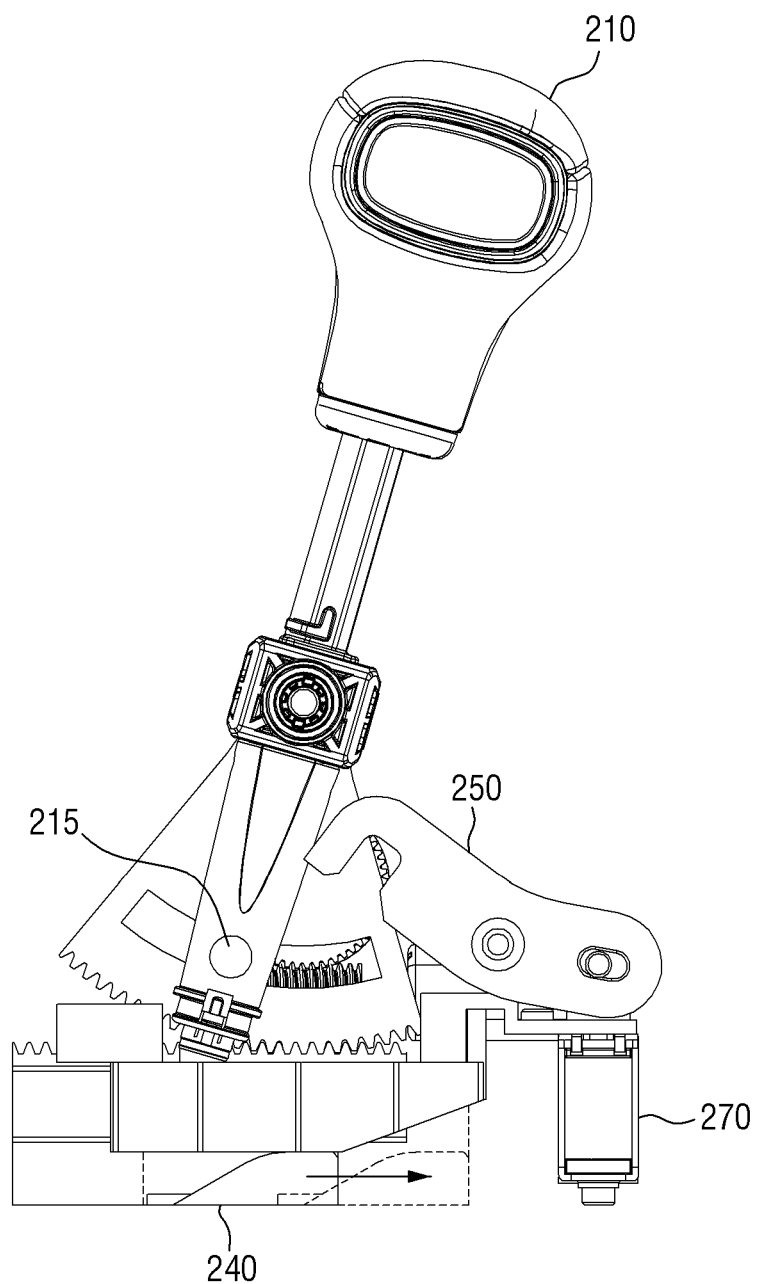
FIGS. 14 and 15 are diagrams illustrating a case in which a support according to the exemplary embodiment of the present disclosure is displaced in a direction to release supporting of the detent groove.
Figure 15:
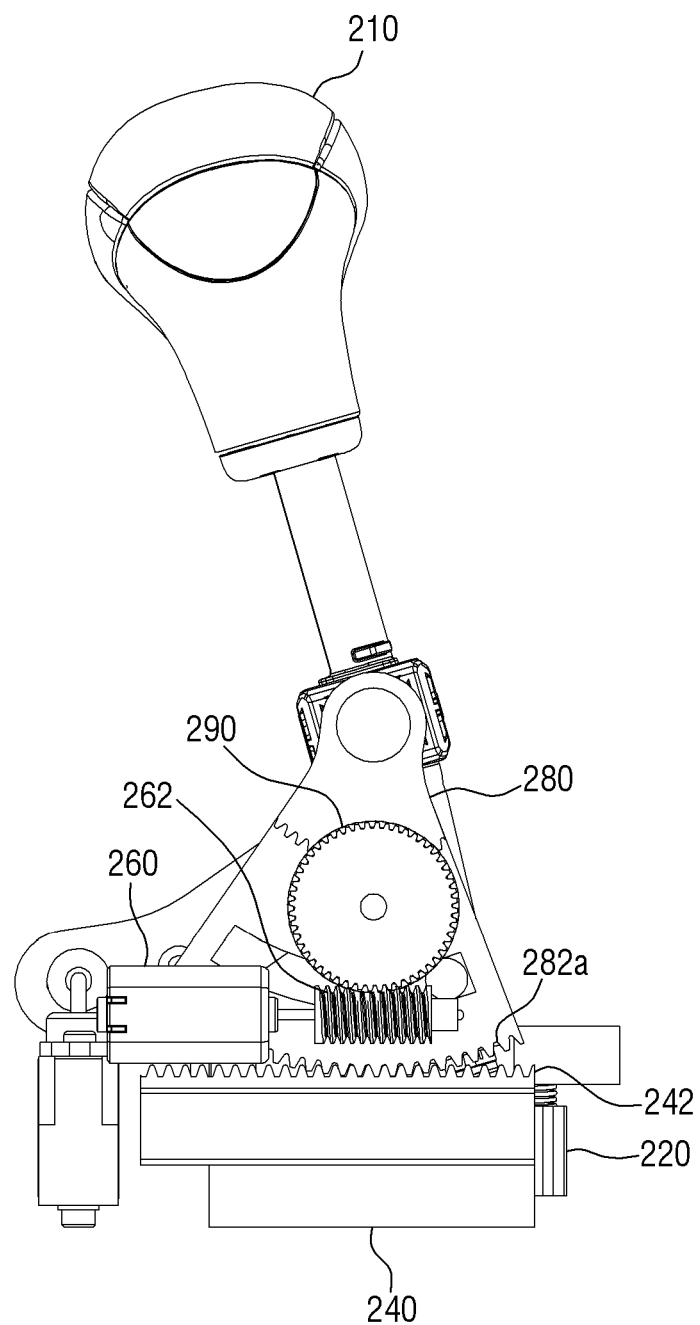
Figure 16:
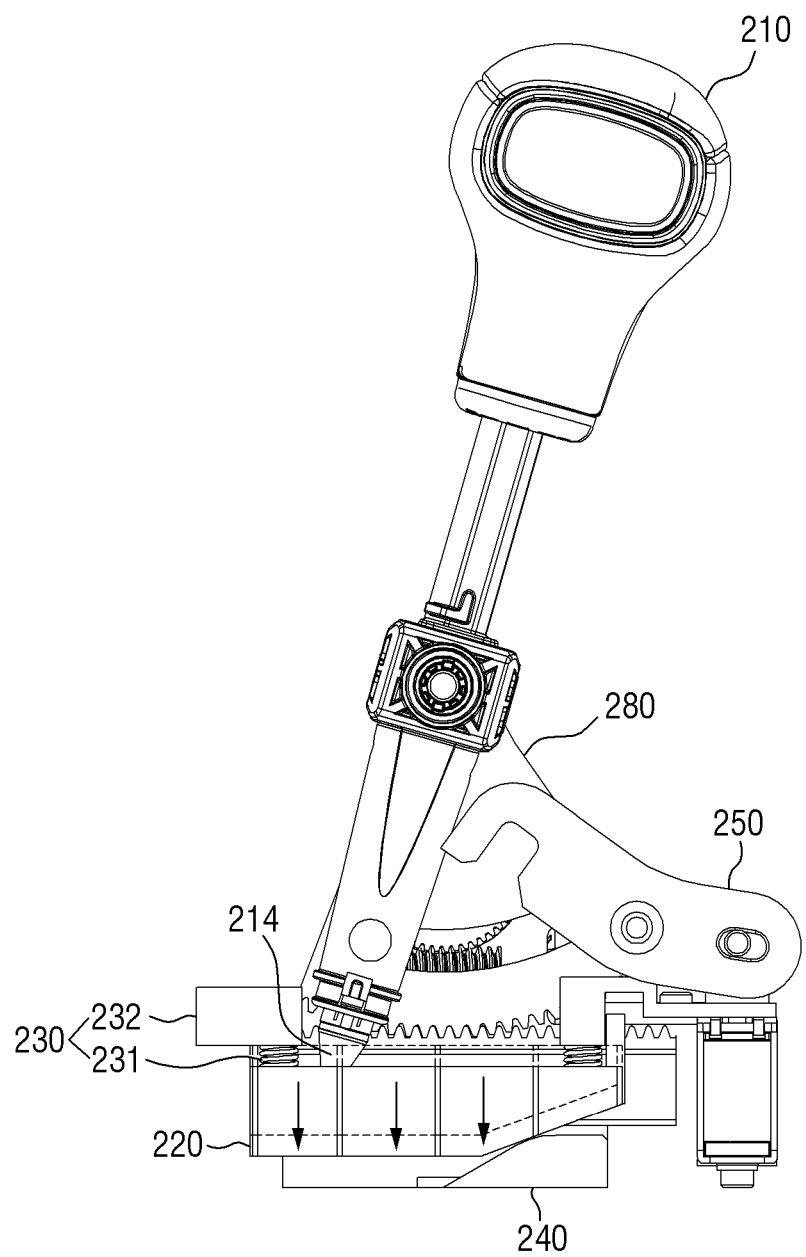
FIG. 16 is a diagram illustrating a case in which the detent groove according to the exemplary embodiment of the present disclosure is descended.
Figure 17:
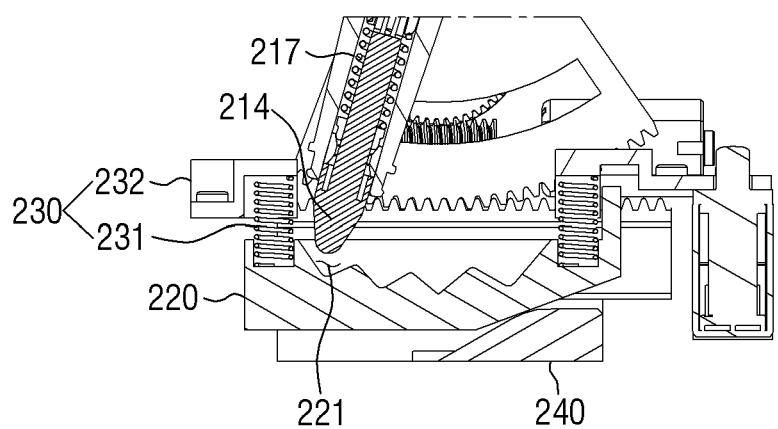
FIG. 17 is a cross-sectional view illustrating a state in which the detent groove according to the exemplary embodiment of the present disclosure has been descended taken along the A-A plane shown in FIG. 3.

FIGS. 12 and 13 are diagrams illustrating a case in which the locker is switched to an unlocked state under the control of the control apparatus according to the exemplary embodiment of the present disclosure, FIGS. 14 and 15 are diagrams illustrating a case in which the support according to the exemplary embodiment of the present disclosure is displaced in a direction to release supporting of the detent groove, FIG. 16 is a diagram illustrating a case in which the detent groove according to the exemplary embodiment of the present disclosure is descended, and FIG. 17 is a cross-sectional view illustrating a state in which the detent groove according to the exemplary embodiment of the present disclosure has been descended.

Referring to FIGS. 12 and 13, the locker 250 may be switched to the unlocked state.

When an automatic control signal is received, the actuator 270 may generate a driving force to switch the locker 250 to the unlocked state.

Referring to FIGS. 14 and 15, after the locker 250 is switched to the unlocked state, the driver 260 may generate a driving force to laterally displace the support 240. The transmission gear 290 may be rotated as the worm gear 262 of the driver 260 is rotated, and the driving force transmitter 280 may be pivoted as the transmission gear 290 is rotated.

The driving force transmitter 280 may have the spur gear 282a engaged with the rack gear 242 of the support 240, and the support 240 may be laterally displaced as the driving force transmitter 280 is pivoted. As the support 240 is laterally displaced, the supporting of the detent groove 220 by the support 240 may be released.

Referring to FIGS. 16 and 17, as the supporting of the detent groove 220 by the support 240 is released, the detent groove 220 may be descended.

As described above, the elasticity provider 230 may include the elastic part 231 and the base 232. The elastic part 231 may apply an elastic force to the detent groove 220 while being supported by the base 232, and thus the detent groove 220 may be descended due to the elastic force.

When the detent groove 220 is descended, the detent groove 220 may be separated from the gear shift lever 210. Specifically, the contact between the detent recess 221 of the detent groove 220 and the bullet 214 of the gear shift lever 210 may be released.

Figure 18:
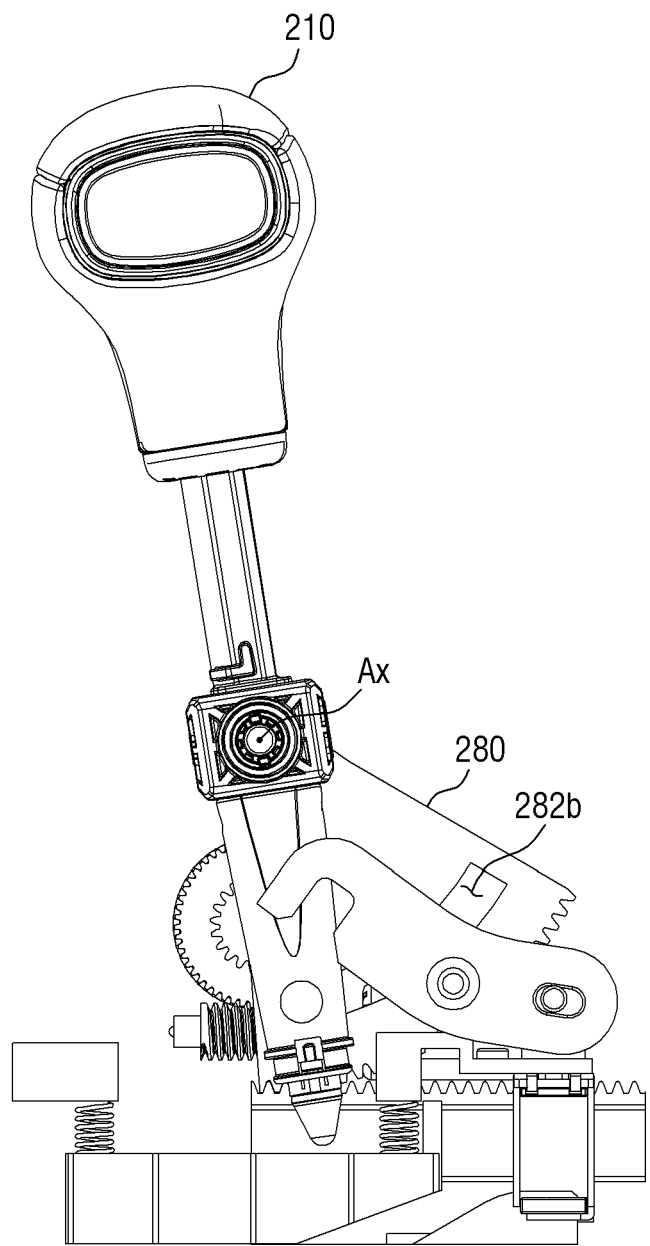
FIGS. 18 and 19 are diagrams illustrating a case in which the gear shift lever according to the exemplary embodiment of the present disclosure is pivoted.
Figure 19:
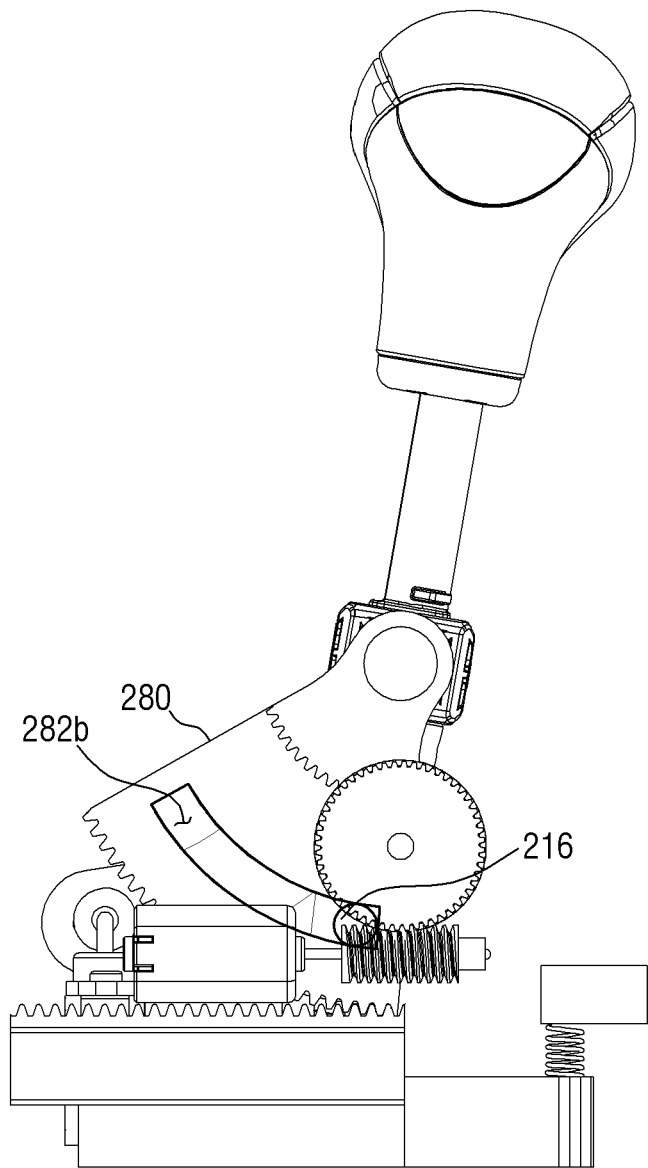
Figure 20:
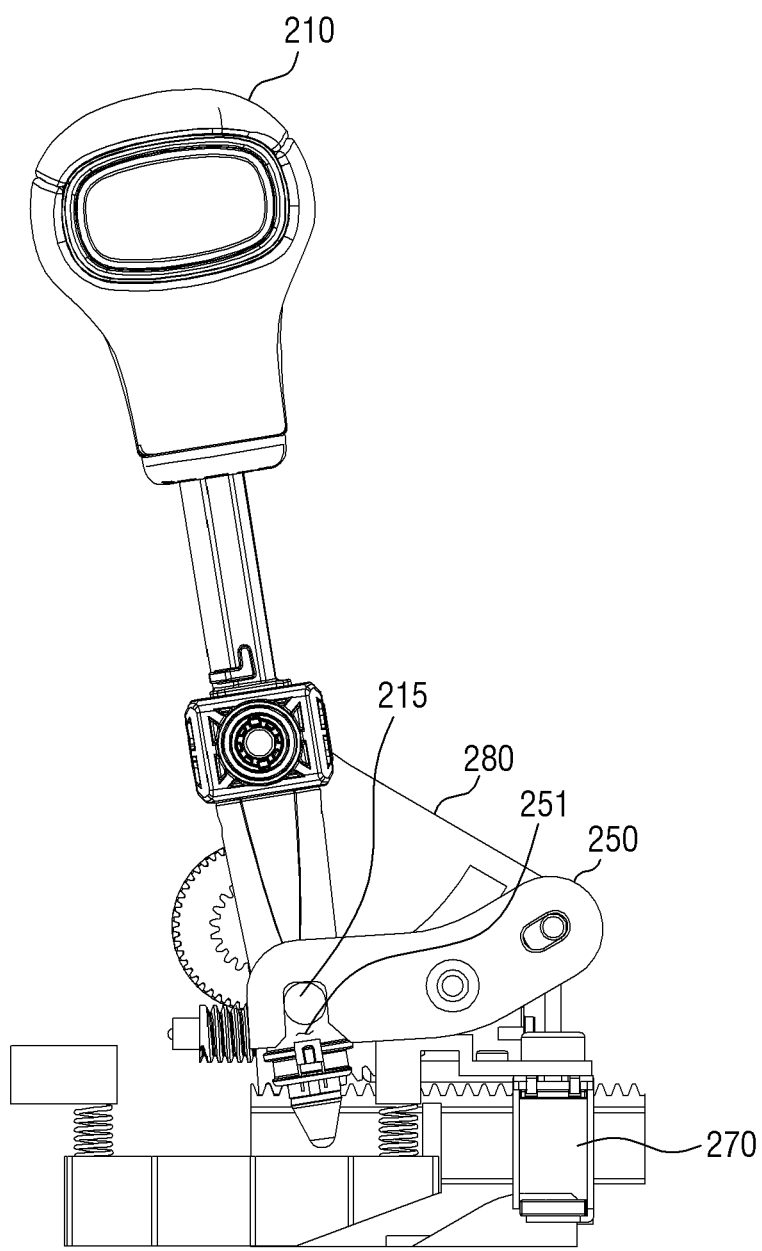
FIG. 20 is a diagram illustrating a case in which the locker is switched to the locked state under the control of the control apparatus according to the exemplary embodiment of the present disclosure.
Figure 21:
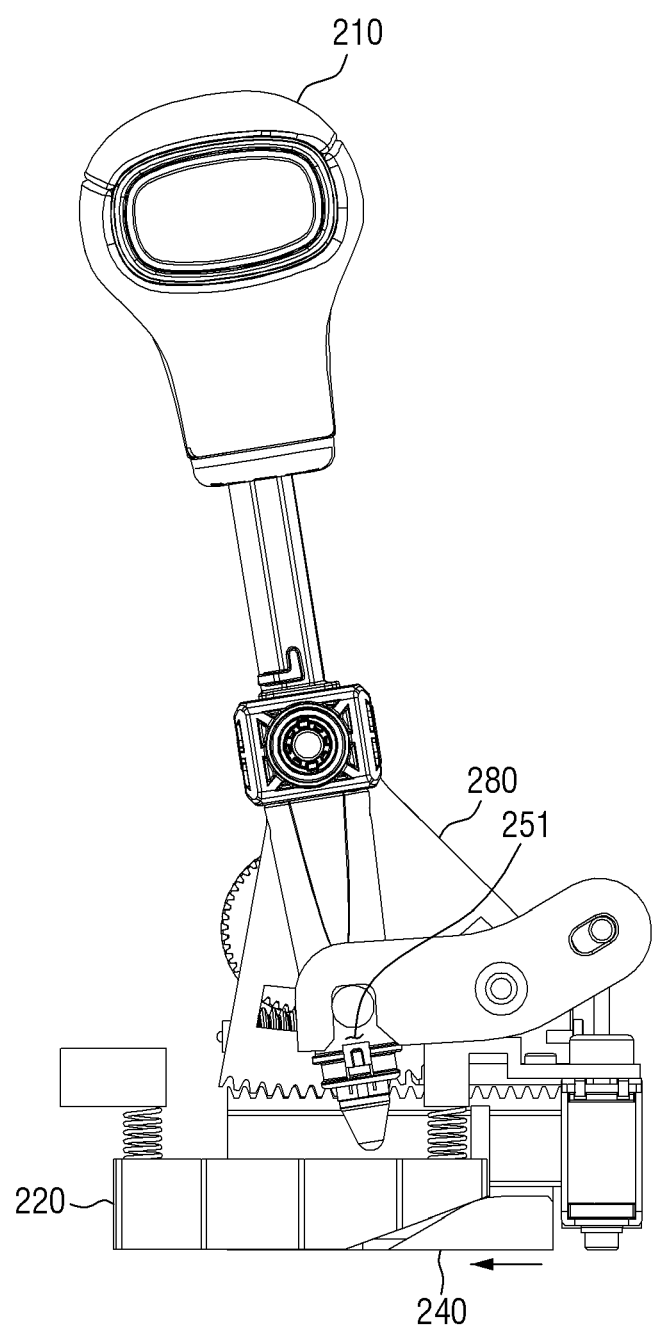
FIGS. 21 and 22 are diagrams illustrating a case in which the support according to the exemplary embodiment of the present disclosure is moved in a direction to provide supporting of the detent groove.
Figure 22:
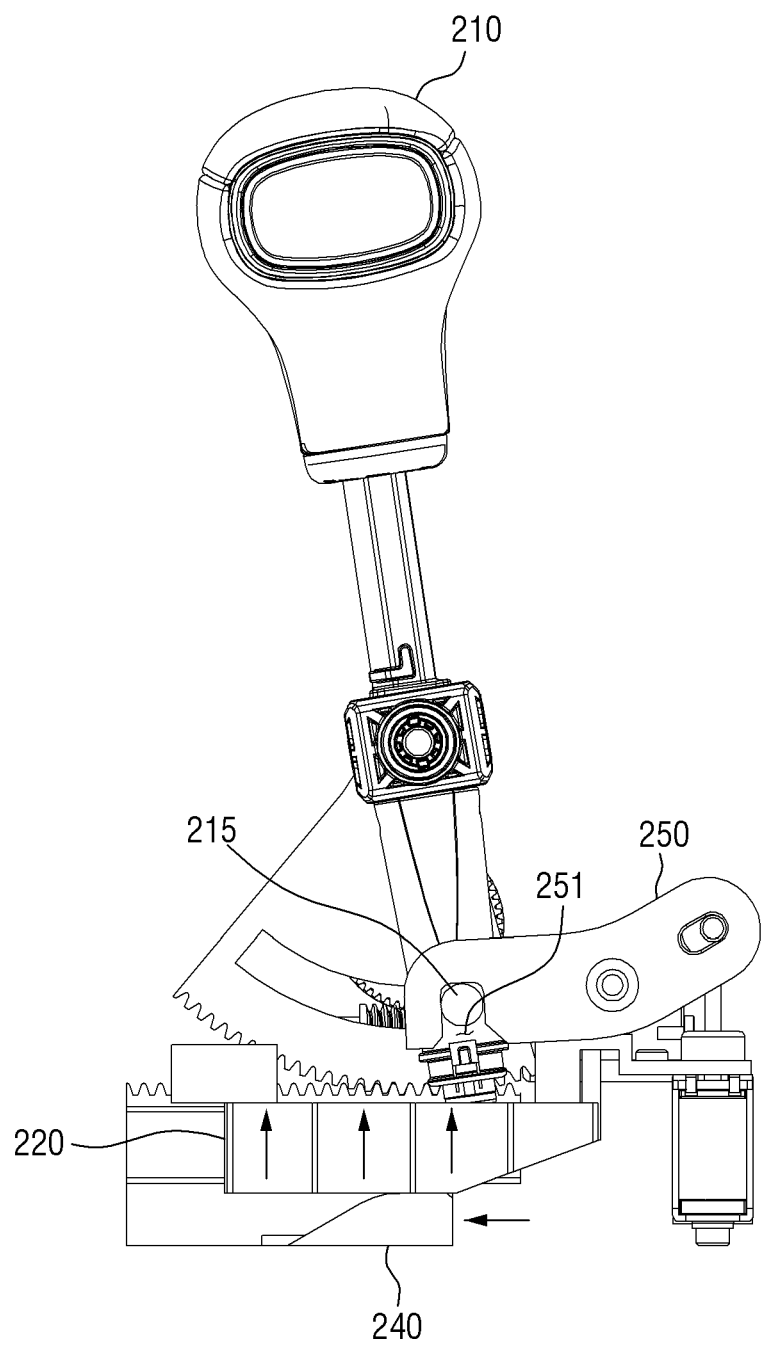
Figure 23:
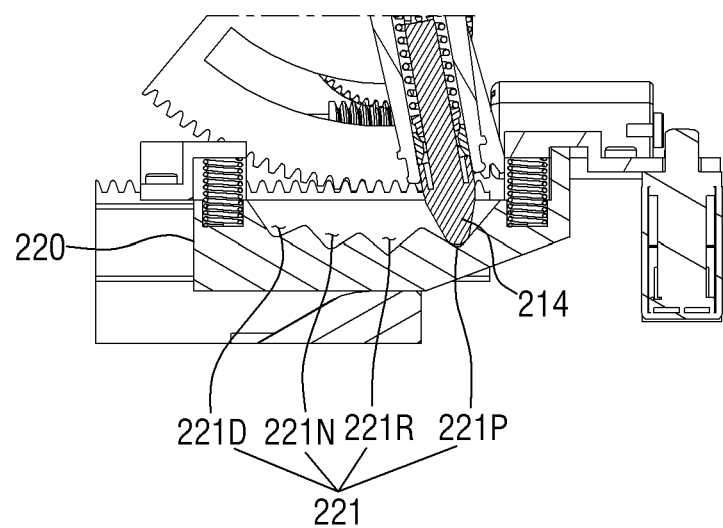
FIG. 23 is a cross-sectional view illustrating a state in which the detent groove according to the exemplary embodiment of the present disclosure has been ascended taken along the A-A plane shown in FIG. 3.

FIGS. 18 and 19 are diagrams illustrating a case in which the gear shift lever according to the exemplary embodiment of the present disclosure is pivoted, FIG. 20 is a diagram illustrating a case in which the locker 250 is switched to the locked state under the control of the control apparatus according to the exemplary embodiment of the present disclosure, FIGS. 21 and 22 are diagrams illustrating a case in which the support according to the embodiment of the present disclosure is displaced in a direction of supporting the detent groove, and FIG. 23 is a cross-sectional view illustrating a state in which the detent groove according to the embodiment of the present disclosure has been ascended.

Referring to FIGS. 18 and 19, the gear shift lever 210 may be pivoted by the driving force transmitter 280.

The rotation pin 216 of the gear shift lever 210 may be inserted into the transmission hole 282b of the driving force transmitter 280, and as the driving force transmitter 280 is pivoted, the rotation pin 216 may be pushed by an inner surface of the transmission hole 282b such that the gear shift lever 210 is pivoted around the rotational axis Ax.

The pivoting of the gear shift lever 210 may be continued until the gear shift lever 210 indicates the P stage.

Referring to FIG. 20, after the gear shift lever 210 indicates the P stage, the locker 250 may be switched to a locked state.

The actuator 270 may generate a driving force to switch the locker 250 to an unlocked state. The control apparatus 100 may transmit a control signal to control the actuator 270. The control apparatus 100 may sense (e.g., detect) whether the gear shift lever 210 is pivoted to indicate the P stage and transmit the control signal for controlling the actuator 270 according to the sensed result. As the control signal is received, the actuator 270 may switch the locker 250 to the unlocked state.

The locker 250 may be switched to a locked state in a state in which the gear shift lever 210 indicates the P stage such that the locker 250 is inserted into the lock hole 251 and the gear shift lever 210 may be fixed (e.g., retained) in a P stage state.

Referring to FIGS. 21 and 22, after the gear shift lever 210 is fixed in a P stage state, the support 240 may be displaced in a direction of supporting the detent groove 220.

When the gear shift lever 210 is fixed in the P stage state, the control apparatus 100 may control the driver 260 to generate a driving force. The support 240 may be displaced according to the generated driving force, thereby supporting the detent groove 220.

The support 240 may be pushed and disposed beneath the detent groove 220 to ascend the detent groove 220.

As the detent groove 220 is ascended, the bullet 214 of the gear shift lever 210 may be inserted into the parking gear stage detent recess 221P as shown in FIG. 23.

Thereafter, when the user wills to drive the vehicle, the locker 250 may be switched to an unlocked state, and when the user manipulates the gear shift lever 210, the detent may be generated and thus the gear stage may be shifted.

In accordance with the transmission apparatus and the transmission system according to the exemplary embodiment of the present disclosure as described above, when the ignition is turned off at a non-parking gear stage, a gear stage may be shifted to a parking gear stage without a detent, presenting an advantage that a chance for parking accident may be reduced.

It should be noted that effects of the present disclosure are not limited to the above-described effect, and other effects of the present disclosure will be apparent to those skilled in the art from the appended claims.

While the exemplary embodiments of the present disclosure have been described with reference to the accompanying drawings, those skilled in the art can understand that the present disclosure may be implemented in other specific forms without departing from the technical spirit or the necessary features of the present disclosure. Therefore, it should be understood that the above-described embodiments are not restrictive but illustrative in all aspects.

What is claimed is:

1. A transmission apparatus comprising:
   a gear shift lever configured to receive a user command for shifting gear stages;
   a detent groove configured to be in contact with the gear shift lever and generate detent when the gear stages are shifted by the gear shift lever;
   a driver configured to generate a driving force when ignition is turned off in a state in which the gear shift lever is positioned at a non-parking gear stage;
   a driving force transmitter configured to separate the detent groove from the gear shift lever by the driving force; and
   a support configured to support the detent groove and allow the gear shift lever to be pressed against the detent groove,
   wherein the support is configured to be displaced by the driving force of the driver to release supporting of the detent groove.

2. The transmission apparatus of claim 1, wherein the detent groove includes a plurality of detent recesses and the detent is generated as a bullet provided at an end portion of the gear shift lever is moved between the plurality of detent recesses.

3. The transmission apparatus of claim 2, wherein the plurality of detent recesses include detent recesses corresponding to a parking gear stage, a reverse gear stage, a neutral gear stage, and a driving gear stage.

4. The transmission apparatus of claim 1, wherein the driving force transmitter pivots the gear shift lever by the driving force so that the gear shift lever is moved to a parking gear stage.

5. The transmission apparatus of claim 1, wherein the support includes an inclined surface inclined in a movement direction, and the detent groove is ascended by being pushed up the inclined surface or is descended due to a decrease in pressure applied from the inclined surface.

6. The transmission apparatus of claim 1, wherein the driving force transmitter is configured to displace the support by the driving force to separate the detent groove from the gear shift lever.

7. The transmission apparatus of claim 6, wherein the driving force transmitter includes:
  a driving force input part configured to receive the driving force from the driver; and
  a driving force output part coupled to the driving force input part and pivoted with the driving force input part to displace the support and pivot the gear shift lever.

8. The transmission apparatus of claim 7, wherein the driving force output part includes:
  a spur gear configured to be engaged with a rack gear provided at the support and laterally displace the support; and
  a transmission hole configured to apply a force to a rotation pin provided at the gear shift lever to pivot the gear shift lever.

9. The transmission apparatus of claim 6, further comprising a transmission gear configured to transmit the driving force of the driver to the driving force transmitter, wherein the transmission gear has a predetermined gear ratio between the driver and the driving force transmitter.

10. The transmission apparatus of claim 9, wherein:
the driver includes a drive motor for generating a driving force and a worm gear configured to be rotated by the driving force of the drive motor; and
the transmission gear includes a worm wheel gear configured to be engaged with the worm gear and a spur gear for transmitting a driving force input to the worm wheel gear to the driving force transmitter.

11. The transmission apparatus of claim 1, further comprising:
  a locker configured to obstruct the gear shift lever from being moved to a parking gear stage; and
  an actuator configured to control the locker to release obstruction of the gear shift lever from being moved to the parking gear stage.

12. The transmission apparatus of claim 11, wherein:
the actuator generates a driving force using a solenoid; and
the locker changes a position thereof by the driving force generated by the solenoid to obstruct the gear shift lever from being moved to the parking gear stage or to accommodate a lock pin provided at the gear shift lever to retain the gear shift lever to the parking gear stage.

13. A transmission apparatus comprising:
  a gear shift lever configured to receive a user command for shifting gear stages;
  a detent groove configured to be in contact with the gear shift lever and generate detent when the gear stages are shifted by the gear shift lever;
  a driver configured to generate a driving force when ignition is turned off in a state in which the gear shift lever is positioned at a non-parking gear stage; and
  a driving force transmitter configured to separate the detent groove from the gear shift lever by the driving force,
wherein the driving force transmitter includes:
  a driving force input part configured to receive the driving force from the driver; and
  a driving force output part coupled to the driving force input part, wherein the driving force output part includes a transmission hole configured to apply a force to a rotation pin provided at the gear shift lever to pivot the gear shift lever.

* * * * *